United States Patent [19]
Larmie

[11] Patent Number: 5,498,269
[45] Date of Patent: Mar. 12, 1996

[54] ABRASIVE GRAIN HAVING RARE EARTH OXIDE THEREIN

[75] Inventor: Henry A. Larmie, Oakdale, Minn.

[73] Assignee: Minnesota Mining and Manufacturing Company, St. Paul, Minn.

[21] Appl. No.: 453,572

[22] Filed: May 26, 1995

Related U.S. Application Data

[63] Continuation of Ser. No. 186,821, Jan. 26, 1994, abandoned, which is a continuation of Ser. No. 951,671, Sep. 25, 1992, abandoned.

[51] Int. Cl.⁶ .............................. B24D 11/00; B24D 11/02
[52] U.S. Cl. .................................. 51/295; 51/294; 51/309
[58] Field of Search .............................. 51/293, 294, 295, 51/309

[56] References Cited

U.S. PATENT DOCUMENTS

| | | | |
|---|---|---|---|
| 3,454,385 | 7/1969 | Amero | 51/298 |
| 3,891,408 | 6/1975 | Rowse et al. | 51/295 |
| 4,126,429 | 11/1978 | Watson | 51/309 |
| 4,314,827 | 2/1982 | Leitheiser et al. | 51/298 |
| 4,331,627 | 5/1982 | Yamamoto et al. | 264/332 |
| 4,333,859 | 6/1982 | Vaughan et al. | 252/455 Z |
| 4,457,767 | 7/1984 | Poon et al. | 51/298 |
| 4,518,397 | 5/1985 | Leitheiser et al. | 51/293 |
| 4,744,802 | 5/1988 | Schwabel | 51/309 |
| 4,770,671 | 9/1988 | Monroe et al. | 51/293 |
| 4,829,031 | 5/1989 | Roy et al. | 501/134 |
| 4,881,951 | 11/1989 | Wood et al. | 51/309 |
| 4,960,441 | 10/1990 | Pellow et al. | 51/293 |
| 4,997,461 | 3/1991 | Markhoff-Mathay et al. | 51/295 |
| 5,002,911 | 3/1991 | Matsumoto et al. | 501/105 |
| 5,009,675 | 4/1991 | Kunz et al. | 51/295 |
| 5,076,815 | 12/1991 | Kunz et al. | 51/293 |
| 5,131,926 | 7/1992 | Rostoker et al. | 51/309 |
| 5,164,348 | 11/1992 | Wood | 51/309 |
| 5,185,299 | 2/1993 | Wood et al. | 501/95 |
| 5,194,072 | 3/1993 | Rue et al. | 51/309 |
| 5,201,916 | 4/1993 | Berg et al. | 51/293 |
| 5,204,300 | 4/1993 | Kumagai et al. | 501/127 |
| 5,215,551 | 6/1993 | Hatanaka et al. | 51/293 |
| 5,259,147 | 11/1993 | Falz et al. | 51/293 |

FOREIGN PATENT DOCUMENTS

| | | | |
|---|---|---|---|
| 394850 | 12/1991 | Austria | C04B 35/10 |
| 0236507A1 | 9/1987 | European Pat. Off. | C04B 35/10 |
| 256182A1 | 2/1988 | European Pat. Off. | C04B 35/10 |
| 0293163 | 11/1988 | European Pat. Off. | C04B 35/10 |
| 0293164A2 | 11/1988 | European Pat. Off. | C04B 35/10 |
| 0368837 | 5/1990 | European Pat. Off. | C04B 35/10 |
| 408771A1 | 1/1991 | European Pat. Off. | C04B 35/10 |
| 0435677A2 | 7/1991 | European Pat. Off. | C04B 35/10 |
| 0441640A2 | 8/1991 | European Pat. Off. | C04B 35/10 |
| 4097942 | 3/1992 | Japan | C04B 35/18 |
| WO92/01646 | 2/1992 | WIPO | C04B 35/10 |

OTHER PUBLICATIONS

"High–Toughness Ce–TZP/Al₂O₃ Ceramics with Improved Hardness and Strength," R. A. Cutler et al., *J. Am Ceram Soc.*, 74, No. 1 (1991) pp. 179–186.

"The Hardness, Stiffness and Toughness of Diphasic Abrasive Materials Prepared by Sol–Gel Techniques," E. Breval et al., *Mat. Res. Bull.*, 20. No. 4 (1985), pp. 413–429.

"Use of Sintered Ceramic Aluminum Oxides in Vitrified Bonded Wheels," S. C. Yoon et al., SME Technical Paper EM90–360, (1990).

"Chemical Processing of Ceramics," D. R. Ulrich, C&EN Special Report Jan. 1. 1990, pp. 28–40.

"Influence of Small ZrO₂ Additions on the Microstructure and Mechanical Properties of Al₂O₃," Hori et al., *Advances in Ceramics, Science and Technology of Zirconia III*, 24A, The American Ceramic Society, (1988), pp. 423–429.

Primary Examiner—Deborah Jones
Attorney, Agent, or Firm—Gary L. Griswold; Walter N. Kirn; Gregory D. Allen

[57] ABSTRACT

A preferred abrasive grain comprises a sintered product of a precursor material comprising alumina, zirconia, and rare earth oxide. The preferred abrasive grain has an average hardness of at least about 21 GPa and an average toughness of at least about 4 MPa·m^(1/2). A method of preparing preferred abrasive grain is provided. The improved abrasive grain are useful in abrasive products.

22 Claims, 2 Drawing Sheets

ABRASIVE GRAIN HAVING RARE EARTH OXIDE THEREIN

This is a continuation of application Ser. No. 08/186,821 filed Jan. 26, 1994, now abandoned, which is a continuation of application Ser. No. 07/951,671 filed Sep. 25, 1992, now abandoned.

FIELD OF THE INVENTION

The present invention relates to improved abrasive grain and a method of making the same. The improved abrasive grain are useful in abrasive products.

BACKGROUND OF THE INVENTION

The abrasives industry generally concerns abrasive products comprising binder and a plurality of abrasive grains which are used to abrade a workpiece (e.g., stainless steel). Desirable abrasive grains are hard, tough, and chemically resistant to the workpiece being abraded. The hardness property is associated with the abrasive grain not yielding from forces of grinding and not dulling. The toughness property is associated with strength and fracture resistance of the abrasive grain.

In general, it is known that inclusion of various materials within an alpha alumina based abrasive grain will modify the characteristics of the grain. What has been sought is improvement with respect to hardness and toughness.

SUMMARY OF THE INVENTION

According to preferred applications of the present invention, there is provided an alumina based ceramic abrasive grain. The preferred abrasive grain has an average hardness of at least about 21 GPa (preferably at least about 22 GPa) and an average toughness of at least about 4 MPa·m$^{1/2}$. The abrasive grain comprises a sintered product of precursor material including therein alumina, zirconia, and rare earth oxide. Preferred ceramic abrasive grain according to the present invention are formed from precursor material comprising yttria and magnesium oxide (and/or precursor(s) thereof) therein.

Preferably, the precursor grit material to the sintered product comprises, by weight on an elemental oxide basis, about 70 to about 95% alumina; about 0.1 to about 15% zirconia; and about 0.1 to about 10% rare earth metal oxide. In addition, the precursor grit material preferably comprises about 0.1 to about 10% yttria and about 0.3 to about 10% magnesium oxide. A most preferred alumina based ceramic grain according to the present invention is formed from a grit material comprising by weight about 85 to about 93% alumina, about 0.5 to about 8% zirconia, about 0.5 to about 10% (preferably about 0.5 to about 5%) rare earth metal oxide, about 0.1 to about 3% yttria, and about 0.3 to about 1.5% magnesium oxide. Preferred rare earth oxides include oxides of lathanum, praseodymium, samarium, neodynium, cerium, and dysprosium.

The method may include preparing a dispersion having nucleating material therein. The term "nucleating material" as used herein refers to a nucleating agent or precursor thereof. The method may also involve a step of including a metal oxide precursor (modifier precursor) within the dispersion.

The base grits formed from the dispersion may be treated, for example, by coating with metal oxide (modifier precursor) precursor prior to sintering.

Preferably, ceramic abrasive grain according to the present invention comprises alumina, zirconia, and a metal oxide selected from the group consisting of: (a) yttria; (b) a rare earth oxide selected from the group of consisting of oxides: ytterbium, neodymium, lanthanum, praseodymium, samarium, gadolinium, cerium, dysprosium, erbium, and mixtures thereof; and (c) mixtures thereof, wherein said alumina is present as one of alpha alumina, alumina reaction product(s), or a combination thereof, said zirconia is present as one of zirconia, zirconia reaction product(s), or a combination thereof, and said metal oxide is present as one of a metal oxide, a metal oxide reaction product(s), or a combination thereof, and wherein said abrasive grain has an average hardness of at least about 21 GPa and an average toughness of at least about 4 MPa·m$^{1/2}$.

The term "reaction product(s)" as used herein refers to oxide(s) that form between two or more metal oxides. For example, alumina and magnesium oxide, if present, may react to form spinel; alumina, magnesium oxide, if present, and lanthanum oxide, if present, may react to form LaMgAl$_{11}$O$_{19}$; and titanium oxide, if present and magnesium oxide, if present, may react to form MgTi$_2$O$_4$. LaMgAl$_{11}$O$_{19}$ is an example of each of an alumina reaction product, a magnesium oxide reaction product, and a lanthanum oxide (rare earth oxide) reaction product. Further, spinel is an example of reaction product that is both an alumina reaction product and a magnesium oxide reaction product.

Preferred abrasive products according to the present invention comprise a sintered product having equiaxed zirconia particles distributed therein (preferably evenly distributed between alpha alumina crystallites), with the majority of zirconia particles having a diameter up to about 0.4 micrometer (preferably less than about 0.1 micrometer). Preferably, the alpha alumina is present as crystallites having a size up to about 1 micrometer and typically up to about 0.5 micrometer. The term "size" in this context is meant to refer to the longest dimension of the particles or crystallites to which reference is being made.

In addition, components are preferably provided such that in combination with a divalent metal cation and the aluminum ion, the rare earth metal will form a preferred reaction product according to the formula MLnAl$_{11}$O$_{19}$ wherein O is oxygen; M is a divalent metal cation; Ln is a rare earth metal ion (in the +oxidation state); and Al is aluminum ion. Preferably, the sintered product (i.e., abrasive grain) is formulated to contain about 5 to about 30% by weight of the MLnAl$_{11}$O$_{19}$.

The present invention includes within its scope abrasive articles having therein preferred abrasive grain material according to the present invention.

The present invention also includes within its scope a preferred process for preparing abrasive grain material.

The drawings comprise a part of the specification and include therein exemplary embodiments. In the drawings, relative material thicknesses may be shown exaggerated to facilitate an understanding of the invention.

DETAILED DESCRIPTION OF THE PREFERRED EMBODIMENTS

The present invention relates to alpha alumina based abrasive grain. According to the invention, there is provided within alpha alumina based abrasive grain certain additional components which provide for improved characteristics. In addition, the invention concerns methods of preparing such improved abrasive grains, and improved abrasive products which include an effective amount of the improved abrasive grains therein.

Herein the term "abrasive grain" or variants thereof is used to refer to the granular abrasive material after it has been prepared (sintered) for inclusion in an abrasive product. The term "base grit" or "base grit material" is used to refer to alumina based ceramic grain precursor which, when sintered, or calcined and sintered, provides abrasive grain according to the present invention. Calcined and uncalcined base grit, as described herein, typically have sufficient porosity to allow a liquid (e.g., water or an organic solvent) to impregnate the pores through capillary action.

In general, the present invention comprises providing an alumina based abrasive grain precursor with an effective amount of at least one rare earth oxide and an effective amount of zirconia therein in a preferred manner. When such a base grit is sintered to form a ceramic product, an improved abrasive grain results.

The Base Grits

In general, the base grits are prepared according to a process including the steps of: (a) preparing a dispersion of alumina hydrate, and (b) drying the dispersion to form dried porous solid (base grit material). From the dried porous solid, abrasive grain material is generated by sintering. Typically, the dried porous solid is calcined to provide a porous precursor grit. During the process, zirconia and rare earth oxide(s) are provided in the porous solid to generate improved grains.

In general, the base grit material can either be initially formed (e.g., from a dispersion) with zirconia and/or rare earth oxide(s) included therein; or the base grit material can be modified to incorporate such materials therein. Characteristics of the resulting abrasive grains can be modified by such variations.

Preferred base grit material for utilization as particles in processes according to the present invention are prepared according to modifications of known sol-gel processes. Known processes, for example, are disclosed in U.S. Pat. Nos. 5,011,508 (Wald), 4,744,802 (Schwabel), 4,623,364 (Cottringer), 4,574,003 (Gerk), 4,518,397 (Leitheiser et al.), and 4,314,827 (Leitheiser), the disclosures of which are incorporated herein by reference. Modifications to the processes in order to achieve the improved product of the present invention are indicated herein. The processes concern formation of a dispersion of the alumina, followed by gelation, drying and (optionally) crushing.

In general, to prepare the alumina base grits by a sol-gel process, a dispersion comprising from about 2 to about 60 percent by weight alpha aluminum oxide monohydrate (typically boehmite) is formed, although other hydrates may be used. The weight percent is based on a total of hydrate plus liquid carrier, without regard to adjuvants or additives. The boehmite can be prepared from various conventional techniques or it can be acquired commercially. Commercially available boehmite usable in sol-gel processes as described herein include: Disperal®, available from Condea Chemie, GMBH of Hamburg, Germany, and Catapal®, available from Vista Chemical Co., Houston, Tex. These aluminum oxide monohydrates are in alpha form, are relatively pure (including relatively little, if any, hydrate phases other than monohydrate), and have high surface area.

Although the liquid carrier may be a non-polar organic carrier (e.g., heptane or hexane), the liquid carrier is typically water, preferably, deionized water. Generally, the dispersion (with respect to all components) contains at least about 10% by weight liquid carrier, preferably, between about 30 and about 80% by weight liquid carrier.

A peptizing agent may be used in the boehmite dispersion to produce a more stable hydrosol or colloidal dispersion. Monoprotic acids which may be used as the peptizing agent include acetic, hydrochloric, formic, and nitric acids. Nitric acid is the preferred peptizing agent. Multiprotic acids are normally to be avoided because they tend to rapidly gel the dispersion, making it difficult to handle or mix in additional components. Some commercial sources of boehmite contain an acid titer (e.g., acetic, formic, or nitric acid) to assist in forming a stable dispersion.

The dispersion may contain a precursor or modifying additive (modifier) which is added to enhance some desired property of the finished product or to increase the effectiveness of a subsequent processing step, such as sintering. Such modifiers are generally introduced in the form of a modifier precursor to an oxide (typically a metal salt material which is a precursor to the corresponding oxide; conversion being accomplished upon application of heat during calcining) soluble in a liquid carrier. They typically comprise water soluble salts. Mixtures of modifiers or modifier precursors may be utilized. Examples of suitable water soluble salts include metal salt precursors (e.g., nitrates and acetates) for oxides of iron, titanium, magnesium, zinc, nickel, silicon, hafnium, and mixtures thereof.

The pH of the dispersion affects how fast the dispersion will thicken or gel. Typically, the pH should be in the range of about 1.5 to about 4. In general, the lower the pH, the higher the rate of gelation. The addition of the modifier precursor generally results in gelation of the dispersion.

The dispersion may contain a nucleating material in an amount effective to enhance the transformation to alpha alumina. Suitable nucleating materials include fine particles of alpha alumina, alpha ferric oxide or its precursor, titanates or their precursors, chromium oxide or its precursor, and other materials which can nucleate the transformation of the base grits during sintering. Nucleating such dispersions is disclosed, for example, in U.S. Pat. Nos. 4,774,802 (Schwabel), 4,623,364 (Cottringer), and 4,964,883 (Morris), the disclosures of which are incorporated herein by reference.

Shaping of the gel, which is optional, may be accomplished by conventional means such as pressing, molding, cutting, or extrusion, with air drying. It may be done in steps, for example, by first forming plastic mass of the partially dried dispersion through extrusion. Examples of shaped abrasive grains include rods, pyramids, cones, triangles or spheres. Irregularly shaped abrasive grain products are conveniently formed by depositing a partially dried dispersion in any convenient size and shape of drying vessel (e.g., a pan-shaped vessel) and drying, typically at a temperature below the frothing temperature of the dispersion.

Whether shaped or not, the dispersion is generally dried to form a base grit material. Air drying steps may be used for removal of free water from the dispersion to form the grit material. Drying can be accomplished, for example, in a forced air oven at a temperature in the range of about 50° C. to about 200° C., preferably between about 75° C. and about 125° C. Generally, the gelled dispersion is heated slowly during drying to inhibit frothing.

After the gel is dried, it may be crushed or shaped through any suitable means. Examples of crushing techniques include use of a hammer mill, ball mill, or a roll crusher. Any method of comminuting the solid can be used, and the term "crushing" is meant to refer to any such method. In general, a wide variety of particle sizes, i.e., about 10 to about 4000 micrometers, may be used as base grits. Generally a selected size range is isolated for any given use. Classification steps such as screening may be used to obtain selected particle sizes or size fractions. It is noted that sintering, or calcining and sintering, generally leads to particle shrinkage on the order of about 33% of linear dimension. This should be taken into consideration during fraction selection.

The crushed or shaped material may in some instances comprise the base grits or base grit material. In other instances, the crushed or shaped material will comprise a "grit precursor," the base grit material being formed by calcining the material or providing other modifications thereto. In typical applications, it will be preferred to calcine the base grit material to remove water or other volatiles. If the grits are formed using a nonpolar organic solvent as the liquid carrier, a calcining step is typically not needed.

During calcining, essentially all the volatiles are removed from the precursor by heating the precursor to a temperature between about 400° C. and about 1000° C. (preferably about 400° C. to about 800° C.). The base grit material is held within this temperature range until the free water and preferably over about 90 weight percent of any bound volatiles are removed.

Incorporation of Zirconia and Rare Earth Metal Oxide(s) into the Base Grits

According to the present invention, the base grits are modified to advantage by the inclusion therein of zirconia and rare earth metal oxide(s). The step of modification with respect to each component (independently or together) can be conducted either during base grit formation or following base grit formation. In addition, both types of components can be introduced via both means if desired.

The average hardness is measured according to the American Standard Test Method (ASTM) Standard E384 ("Standard Test Method for Microhardness of Materials," 1991 *Annual Books of ASTM Standards,* Sec. 3, Vol. 3.01, p 463) with a 500 gram load, the test being incorporated herein by reference. The average toughness is measured according to the test procedure outlined in the article "Equilibrium Penny-like Cracks in Indentation Fracture," by Lawn and Fuller, *J. of Mat. Sci.,* Volume 10, (1974), pp. 2016–24, incorporated herein by reference. According to preferred applications of the present invention, abrasive grain are provided which have an average hardness of at least about 21 GPa (preferably at least about 22 GPa) and an average toughness of at least about 4 MPa·m$^{1/2}$.

In typical applications, improvement will be found if the base grit material is provided with sufficient amounts of the components so that the sintered ceramic abrasive grain which results comprises: about 70 to about 95% by weight, preferably about 85 to about 93%, alumina; about 0.1 to about 15, preferably about 0.5 to about 8%, zirconia; and about 0.1 to about 10%, preferably about 0.5 to about 5%, rare earth oxide(s). In addition preferred abrasive grain include less than about 10%, preferably about 0.1 to about 3%, yttria; and, about 0.5 to about 10%, preferably about 0.3 to about 1.5%, magnesium oxide. The rare earth oxide(s) can be selected from the group consisting of oxides of: praseodymium, samarium, ytterbium, neodymium, lanthanum, gadolinium, cerium, dysprosium, erbium, and mixtures thereof. In this context, when it is said that the abrasive grain includes these various materials by weight percent, reference is meant to the final sintered ceramic abrasive grain, and the weight percent is stated on an elemental oxide basis without regard to the phases present and without regard to the presence of any coating on the grain. Thus, should the abrasive grain be coated, the weight percent should be based upon or calculated based upon the grain minus the weight of the coating; i.e., the sintered core.

A variety of methods may be utilized to introduce the various minor (weight percent) components, i.e., non-alumina components, into the base grits. While any of the methods disclosed generally result in improved base grits, variations in the methods used will lead to variations in the characteristics of the final sintered product.

With respect to zirconia introduction, in general, the zirconia may be introduced by any one of three methods, or a combination of these methods. The first general method is the provision of zirconia sol in the dispersion of aluminum oxide monohydrate during the base grit formation, either by zirconia sol addition to the dispersion or by mixing zirconia particles into the dispersion in a manner such that zirconia sol formation results. The second involves the introduction of a zirconia precursor (e.g., a zirconium salt) into the dispersion of aluminum oxide monohydrate during the base grit formation. The third involves introduction of a zirconia precursor (zirconium salt) into porous base grits after their formation through impregnation. Preferably, the zirconia is introduced as a zirconium component during base grit formation either as zirconia particles in the dispersion or as a zirconium salt (precursor to zirconia) provided in the dispersion. In general, the rare earth metal oxides, magnesium oxide, and yttria (if used) are introduced into the base grits by either or both of the latter two processes described for zirconia (i.e., either through introduction of salt precursors of these materials into the dispersion during the sol-gel process, or impregnation of already formed base grits with the appropriate salts). Preferably, the rare earth metal oxide salt precursor is introduced by impregnation of the base grit material. A reason for this is that if rare earth metal oxide precursor is introduced during the sol-gel process (i.e., in the dispersion of zirconia or zirconia precursor and alumina precursor) migration of the rare earth salt(s) during drying may lead to non-uniform dispersion of the rare earth oxide(s) in the resulting base grit material.

A preferred means for incorporating ceria into the abrasive grain is disclosed in Assignee's copending application entitled "Method For Making Abrasive Grain Containing Alumina and Ceria," U.S. Ser. No. 07/951,443, filed the same date as the instant application, the disclosure of which is incorporated herein by reference.

When metal salts (metal oxide precursors including zirconium salts) are utilized, in general, the oxide of the metal will result after drying and calcining of the resulting particles. That is, herein the term "oxide precursor" or variants thereof is used to refer to a salt (e.g., a nitrate salt) which, upon exposure to heat, is converted to corresponding oxide.

Introduction of metal oxide precursor(s) into the sol-gel is merely a matter of mixing an appropriate oxide precursor (metal salt) into the dispersion. The zirconia precursor may be, for example, a zirconyl alkylate, typically, zirconyl formate or zirconyl acetate. Such salts are water soluble and, thus, can be readily mixed into the dispersion in the sol-gel process, provided the liquid carrier is water.

Rare earth oxide precursors may be the appropriate metal salt of a volatile anion, for example, nitrates, formates, and acetates. The most readily available chemical forms of rare earth metals are typically the oxides, which are converted to the salts (modifier precursors) by reaction with an excess of concentrated nitric acid to produce a nitrate solution. The nitrate solution can be readily introduced into the dispersion of the sol-gel process through mixing. Similar processes can be used, for example, to provide the dispersion of the sol-gel process and, thus, the base grits ultimately formed with oxide precursors of yttria, magnesium oxide, zinc oxide, cobalt oxides, nickel oxides, hafnia, chromium oxides, and mixtures thereof therein.

A preferred material for certain applications results if: the zirconia addition occurs during the sol-gel process so that an even distribution of zirconia throughout the resulting ceramic grain is achieved; and the rare earth metal oxide addition (and any other oxide addition) occurs through impregnation of the base grit material. In this manner, the product will have relatively even distribution of zirconia throughout.

The most preferred method for incorporating zirconia into the abrasive grain is disclosed in Assignee's copending application entitled "Abrasive Grain Containing Alumina and Zirconia," U.S. Ser. No. 07/951,654, filed the same date as the instant application, the disclosure of which is incorporated herein by reference.

In general, calcined base grits prepared according to the sol-gel process are porous; i.e., they generally have pores about 700–900 nanometers in size (diameter) extending therein from an outer surface. When mixed with a liquid carrier (preferably water, more preferably deionized water) containing dissolved metal salt therein, the metal salt can impregnate the pores through capillary action. When dried and calcined, the impregnate (metal oxide precursors) will be converted to metal oxide(s).

In general, all that is required for introduction of metal oxide precursor through the impregnation process is a mixing of an appropriate amount of carrier liquid with the base grits. Generally, enough liquid carrier should be used to give substantial saturation (at least about 70% saturation) of the grits. When the base grits are prepared according to the sol-gel process described above, at least about 50 mL and, preferably, at least about 60 mL of liquid carrier with impregnate dissolved therein should be mixed with each 100 grams of base grits. If the ratio is within the 50 to 60 mL per 100 gram range as stated, in general all of the dissolved metal oxide precursor will impregnate the base grits, i.e., excess solution is preferably avoided. From the above descriptions, it will be understood that when impregnation is used, the modifier(s) (or modifier precursor(s)) will be preferentially partitioned toward outer parts of the abrasive grains. Introduction of various materials into base grits by an impregnation process is generally described in U.S. patent application Ser. No. 07/799,867 filed Nov. 27, 1991, the disclosure of which is incorporated herein by reference.

As indicated above, zirconia may be introduced into the base grits during the sol-gel process by mixing of a zirconia sol into the alumina-hydrate dispersion. A zirconia sol is a dispersion of colloid zirconia particles in a liquid medium. The liquid medium can be water (preferably deionized water) or a non-polar organic carrier (e.g., heptane and hexane), however, it is generally preferred that a majority (greater than 50% by weight) of the liquid medium be water (preferably deionized water). The zirconia sol should contain, by weight, between about 5 and about 60%, preferably about 15 or about 40%, colloidal zirconia particles. It is preferred that the particle size be at least about 97% by weight and preferably about 100% by weight less than about 0.1 micrometer, preferably, with at least about 90% by weight less than about 0.05 micrometer and at least about 50% by weight less than about 0.02 micrometer.

The pH of the zirconia sol prior to addition to the dispersion is typically be less than about 5, preferably less than about 4. The zirconia sol may contain some nitric or acetic acid as stabilizers. When this method is practiced, the dispersion formed in the sol-gel process comprises both alumina sol and zirconia sol. The preferred range of percent solids of the zirconia in the dispersion with the alumina is between about 5 and about 30 percent.

Conversion of the Base Grits to Improved Abrasive Grain

According to the present invention, the base grit are converted into improved abrasive grain through application of one or more treatments. A principal step of conversion is sintering of the base grit to form ceramic abrasive grain comprising alumina, zirconia, and rare earth metal oxide. However, further modifiers, nucleating materials, and/or coating may be added to the base grit. The base grit may be improved by more than one of these referenced treatments.

A. Sintering of the Abrasive Grain Precursor

The base grit material, including the alumina, zirconia, rare earth metal oxide, and any other modifier and/or nucleating material and/or coating thereon, comprises the precursor to the ceramic abrasive grain. Upon sintering, the grits (grit material) or precursor form a unique and improved abrasive grain.

Sintering of the abrasive grain may be accomplished through a variety of conventional processes. Typically, the sintering will be conducted at a temperature between about 1200° C. and about 1650° C. for a sufficient period of time to complete the conversion of the precursor. Generally, the sintering step comprises the conversion of alumina to alpha alumina (or alpha alumina and reaction product of alumina with metal oxide modifier(s)). Although the length of time to which the base grits should be exposed to sintering temperatures may be varied depending upon factors such as the precise composition of the grit, generally sintering can be accomplished within a time period of a few seconds to about 120 minutes. The sintering of various types of base grits is described in general in U.S. Pat. No. 4,314,827 (Leitheiser et al.), incorporated herein by reference. The techniques of sintering described in that reference may be applied to grits prepared according to the present invention.

B. (Optional) Impregnation of the Base Grits With Modifier Prior to Sintering; Nucleation; Coating Preferred characteristics can be imparted to the sintered product by impregnating the base grits with still further metal oxide modifier precursor (in addition to rare earth metal oxide precursor and/or zirconia precursor) by impregnation. The impregnation procedure described generally above may be utilized. These metal oxide modifiers described with respect to the sol-gel process may be used.

A nucleating material may be added to the base grits to result in a seeded microstructure in the outer portion of the base grit during firing. The nucleating material may be added by treating the base grits with a liquid medium having the nucleating material carried therein. The treatment may be conducted simultaneously with impregnation.

The abrasive grains of the present invention may further comprise a surface coating, i.e., a coating covering the sintered core. Typically, the coating will comprise silica and/or metal oxide, most typically zirconia, or alumina (e.g., alpha alumina, transitional alumina, or hydrated alumina). Any of a variety of coating methods may be utilized, including the ones described in U.S. Pat. Nos. 5,011,508 (Wald), 1,910,440 (Nicholson), 3,041,156 (Rowse), 5,009,675 (Kunz), 4,997,461 (Markhoff-Matheny), and 5,042,991 (Kunz), the disclosures of which are incorporated herein by reference. The preparation of the coating may include the use of nucleating material. In some instances, a preferred coating not described in the above-cited references may be applied to the base grits by addition of a dispersion or suspension carrying inorganic particulates (typically metal oxides) therein to the base grits. A coating formed from inorganic particulates in this manner is described in Assignee's copending U.S. application Ser. No. 07/920,768, incorporated herein by reference. An alternative coating, formed from metal alkoxides, is described in Assignee's copending U.S. application Ser. No. 07/920,834, incorporated herein by reference.

The Resulting Abrasive Grain

Figure 4:
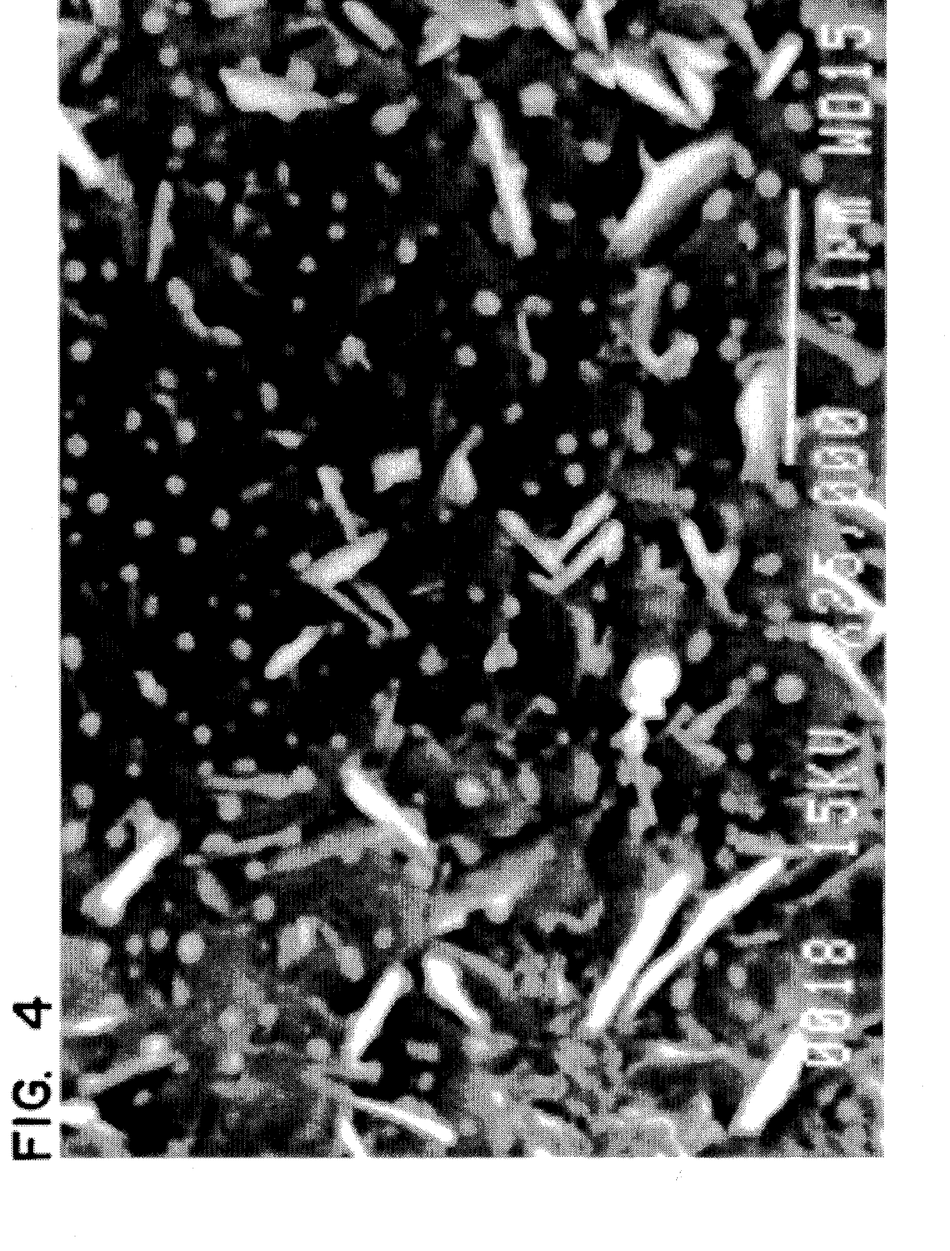
FIG. 4 is a scanning electron photomicrograph of an abrasive grain prepared according to Example 33 and taken at 25,000×.

Selected preferred abrasive grains according to the present invention are depicted in the electron photomicrograph of FIG. 4. The photomicrograph of FIG. 4 is a cross-sectional view of an example of abrasive grain according to the present invention (Example 33). The abrasive grain sample depicted was first polished to a one micrometer finish and then thermally etched for 15 minutes at 1250° C. The sample was then examined in the scanning electron microscope at 25,000× magnification. The microstructure comprises an alpha alumina matrix comprising alpha alumina crystallites, and within the matrix are a plurality of platelets and equiaxed zirconia particles. The platelets are primarily a magnetoplumbite structure according to the formula: $MLnAl_{11}O_{19}$, where M is divalent metal cation such as a magnesium cation; Ln is rare earth ion (e.g., in a +oxidation state) (e.g., cation of praseodymium, samarium, ytterbium, neodymium, lanthanum, cerium or erbium); O is oxygen; and Al is aluminum ion. The platelets are randomly distributed in the alumina matrix (between alpha alumina crystallites and zirconia particles). The diameter of the platelets is generally up to about 1 micrometer. The thickness of the platelets is between 0.04 and 0.08 micrometer, usually about 0.04 to about 0.06 micrometer. The volume of the platelets can range from about 5 to about 50% of the microstructure. Usually the platelets comprise between about 25% and about 35% of the core volume. The volume percentages are greatly dependent upon the abrasive grain formulation.

The equiaxed zirconia particles generally have a diameter less than about 0.1 micrometer, usually between about 0.01 and about 0.04 micrometer, and most typically about 0.02–0.03 micrometer. The zirconia particles are distributed between alpha alumina crystallites. The term "equiaxed" as used in this context means that each zirconia particle is shaped with an extension of approximately equal amount from a central point. Thus, each zirconia particle is roughly spherical.

The microstructure depicted in FIG. 4 exhibits some unique properties with respect to abrasive grain behavior. In particular, the presence of both platelets and zirconia particles leads to a tough abrasive grain. Although not wishing to bound by any theory, it is believed that the presence of the platelets inhibits crack propagation through the sample.

It is also believed that the presence of zirconia in an alumina system, as well as the particle size of the zirconia and the volume present, greatly enhances the mechanical properties of the resulting abrasive grains. Zirconia particles appear to not only toughen the abrasive grain, but also to improve the microstructure by hindering grain growth in alumina and alumina reaction products. Thus, it is theorized that the addition of zirconia alters the alumina microstructure and aids in densification. The toughness can be attributed (in some compositions) to the utilization of tetragonal to monoclinic transformation concept of the precipitated or the dispersed zirconia particles. The strength increase by the zirconia addition is therefore the combined effects of toughness increase and microstructural improvement. It is also theorized that the addition of rare earth oxide(s) aids in the stabilization of tetragonal or cubic zirconia phases in some compositions.

Preferred abrasive grains, as indicated previously, are both hard and tough. These properties are associated with achievement of the microstructure described in the previous three paragraphs. In general, the hardness property is associated with resistance of the grain to yielding from the forces of grinding. The toughness property is associated with strength and fracture resistance. If an abrasive grain is relatively hard, but not sufficiently tough, then the grain will tend to fracture prematurely during abrading, i.e., a reduced useful lifetime results. On the other hand, if the abrasive grain is relatively tough but not hard, then it will rapidly dull during abrading, i.e., it will exhibit reduced abrading performance. Although hardness and toughness properties are often considered to be inversely related (i.e., increase in hardness leads to decrease in toughness and vice versa) in systems according to the present invention both properties are achieved at desirable levels.

Abrasive Products

The present invention includes within its scope the provision of abrasive products having improved abrasive grains therein. Preferably, the abrasive grains will have been prepared according to processes described herein and comprise the sintered product of base grit having the appropriate metal oxide or metal oxide precursors therein. Again, the abrasive grain may have been formed with a nucleating agent present and/or with a coating, as generally described.

One type of abrasive product according to the present invention comprises a backing (substrate) with abrasive grains, as described herein, adhered thereto by binder. The backing may be cloth, polymeric film, fiber, nonwoven web, paper, combinations thereof, or treated versions thereof. A variety of inorganic or organic binders can be utilized. The abrasive grains may be applied in one layer or in a plurality of layers. A preferred method of making coated abrasives is described in U.S. Pat. Nos. 4,734,104 (Broberg) and 4,737,163 (Larkey), incorporated herein by reference.

Figure 1:
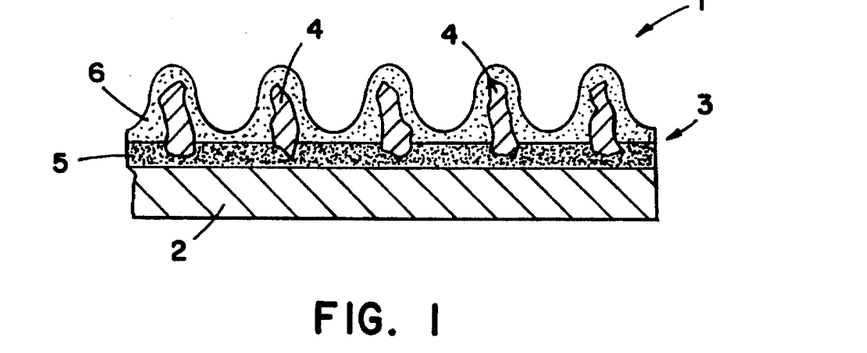
FIG. 1 is a fragmentary cross-sectional schematic view of a coated abrasive product, incorporating therein abrasive grains according to the present invention.

An example of a coated abrasive product is provided in FIG. 1 at reference numeral 1. Referring thereto, backing (substrate) 2 has abrasive layer 3 comprising abrasive grain 4 secured to a major surface of backing 2 by make coat 5 and size coat 6. In some instances a supersize coat, not shown, may be used.

Figure 2:
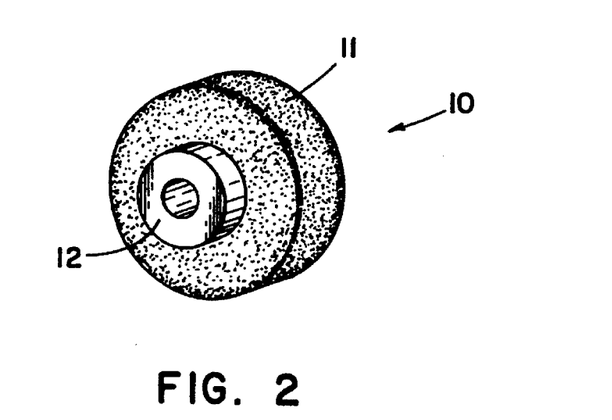
FIG. 2 is a perspective view of a bonded abrasive product incorporating abrasive grain according to the present invention.

Bonded abrasive products (e.g., grinding wheels and cutoff wheels) according to the present invention generally comprise shaped masses of abrasive grain, described herein, held together by a binder. Conventional binders for grinding wheels include organic, metallic, or vitrified binder. In FIG. 2, grinding wheel 10 is depicted comprising abrasive grain 11 molded in a wheel and mounted on hub 12. For additional details in the preparation of grinding wheels see, for example, U.S. Pat. No. 4,997,461 (Markhoff-Matheny), the disclosure of which is incorporated herein by reference. Cutoff wheels can be made using convertional techniques known in the art. Binders for cutoff wheels include organic binder.

Figure 3:
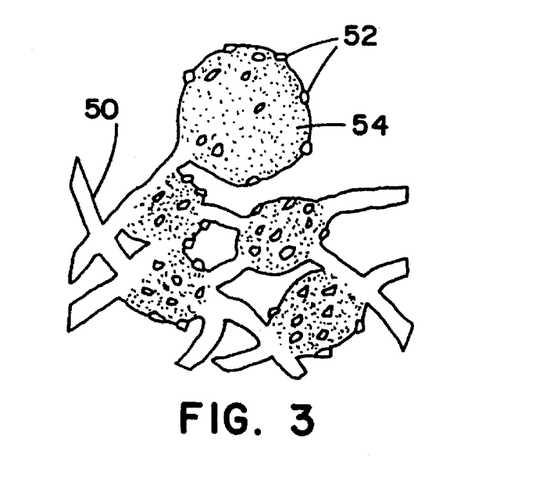
FIG. 3 is an enlarged, fragmentary, schematic view of a nonwoven abrasive product incorporating abrasive grain according to the present invention.

Nonwoven abrasive products incorporating abrasive grains according to the present invention typically comprise an open porous lofty polymer filament structure having the abrasive grains of the invention distributed throughout the fiber structure and bonded therein by an organic binder. Typical fibrous filament structures usable with such constructions comprise polyamides, polyesters, and polypropylenes. In FIG. 3, a schematic depiction, enlarged about 100×, of a typical nonwoven abrasive article is provided. The article comprises fibrous mat 50 as a substrate onto which abrasive grain 52 are adhered by binder 54. For additional details in the preparation of nonwoven abrasive products see, for example, U.S. Pat. No. 2,958,593 (Hoover et al.), the disclosure of which is incorporated herein by reference.

As indicated generally above, abrasive products according to the present invention generally comprise binder and abrasive grains or particles therein. A wide variety of binders may be used in abrasive products according to the present invention, including conventional ones. Useful binders include phenolic, urea-formaldehyde, melamine-formaldehyde, polyester resins, glue, aminoplast resins, epoxy resins, acrylate resins, urethane resins and combinations thereof. The binder may also include inorganic particulate. Such particulates can be grinding aids or fillers. Examples of such grinding aids include cryolite, ammonium cryolite, potassium tetrafluoroborate, polyvinyl chloride, sulfur and sodium chloride. Examples of fillers include calcium carbonate, silica and calcium metasilicate.

Abrasive products or articles according to the present invention may contain, as particulate material therein, 100% abrasive grains which have been improved according to the descriptions herein. In addition, or alternatively, the abrasive articles may contain a blend of abrasive grains according to the present invention with other types of abrasive grains or diluent grains. Conventional abrasive grains usable in this fashion include fused aluminum oxide, silicon carbide, garnet, diamond, cubic boron nitride, fused alumina-zirconia, and other sol-gel abrasive grains. Diluent grains include marble, gypsum, and glass. Abrasive grains according to the present invention may be combined with abrasive agglomerates (see, e.g., U.S. Pat. No. 4,799,939 (Bloecher et al.)).

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

For all of the examples, the abrasive grains were made according to one of the Procedures outlined below. All abrasive grain formulations are based upon weight on an elemental oxide basis. After the abrasive grains were made, they were employed in a coated abrasive fibre disc which was made according to the described procedure. The resulting coated abrasive disc was tested according to a Test Procedure described below. For Examples 1 to 47, the preparation of the abrasive grain did not include the use of a nucleating material, i.e., the abrasive grains were unseeded.

The weight percent figures given herein for abrasive grains are calculated on an elemental oxide base without regard to the phases (e.g., reaction product(s)) present.

General Procedure I for Making the Abrasive Grains

The following were charged (with continuous mixing) into an 18.9 liter polyethylene lined steel vessel to form a dispersion, 2269 parts of room temperature deionized water, 45 parts of 16N analytical reagent grade nitric acid and 643 g of alpha aluminum oxide monohydrate powder sold under the trade designation Disperal®. The resulting mixture was dispersed at high speed for 3 to 4 minutes using a Giford-Wood Homogenizer Mixer (Greeco Corp., Hudson, N.H.). The resulting sol was poured into a 46 cm by 66 cm by 5 cm polyester lined aluminum tray where it was dried in a forced air oven at 100° C. for about 24 hours to a friable solid. The resulting dried material was crushed using a "Braun" type UD pulverizer having a 1.1 mm gap between the steel plates to form particles. The particles were screened between 0.125 to 1 mm screen size. The retained particles were fed into a rotary kiln to form calcined particles. The rotary kiln was a 16 cm diameter, 140 cm long stainless steel tube having a 40 cm 600° C. hot zone. The tube was inclined at a 2.4 degree angle with respect to the horizontal. The tube rotated at about 6 rpm to provide a residence time within the kiln of about 4 to 5 minutes.

The impregnation solutions were prepared with deionized water. The magnesium nitrate solution was about 11% solids on an oxide basis. The yttrium nitrate solution was about 23% solids on an oxide basis. The lanthanum nitrate solution was about 28% lanthanum solids, and the cerium nitrate solution was about 39% solids on an oxide basis.

For each impregnation step, there was approximately twice as much by volume of the calcined particles to the impregnation solution. The impregnation solution and the calcined particles were thoroughly mixed together to cause the solution to be impregnated into the calcined particles by capillary action. If a zirconia precursor was present in the impregnating solution, then a vacuum was utilized in addition to the mixing to cause the zirconia precursor to impregnate into the calcined particles. The resulting impregnated particles were dried and then the dried particles were fed into the rotary calciner as described above. For multiple impregnations, the calcined particles were allowed to cool and then they were impregnated again with the desired impregnation solution and calcined again.

Next, the calcined, impregnated particles were fed into a 1400° C. rotary kiln. The kiln was an 8.9 cm diameter, 1.3 meter long silicon carbide tube inclined at 4.4 degrees with respect to the horizontal and had a 76 cm hot zone. The kiln rotated at 6 rpm to provide a residence time in the kiln of about 5 minutes. The product exited the kiln into room temperature air where it was collected in a metal container and allowed to cool to room temperature.

General Procedure II for Making the Abrasive Grains

This General Procedure II was essentially the same as General Procedure I, except that the original sol contained, in addition to the alumina sol, a zirconia sol. The average zirconia particle size in the zirconia sol was between about 5 and about 10 nanometers. The zirconia sols were about 20% solids (in a 15% concentrate of acetic acid aqueous solution, pH 3.5) and were purchased from Nyacol Products Inc. of Ashland, Mass.

General Procedure III for Making the Abrasive Grains

The following were charged (with continuous mixing) into an 18.9 liter polyethylene lined steel vessel to form a dispersion, 2269 parts of room temperature deionized water, 45 parts of 16N analytical reagent grade nitric acid, and 643 parts of alpha aluminum oxide monohydrate powder sold under the trade designation Disperal®. Also added to this dispersion were the optional modifier salts. These salts were the same as described above in General Procedure I. The resulting mixture was dispersed at high speed for three to four minutes using a Giford-Wood Homogenizer Mixer (Greeco Corp., Hudson, N.H.). The resulting sol was poured into a 46 cm by 66 cm by 5 cm polyester lined aluminum tray where it was dried in a forced air oven at 100° C. for about 24 hours to a friable solid. The resulting dried material was crushed using a "Braun" type UD pulverizer having a 1.1 mm gap between the steel plates to form particles. The particles were screened between 0.125 to 1 mm screen size. The retained particles were fed into a rotary kiln to form calcined particles. The kiln was a 16 cm diameter, 140 cm long, stainless steel tube having a 40 cm 600° C. hot zone. The tube was inclined at a 2.4 degree angle with respect to the horizontal. The tube rotated at about 6 rpm to provide a residence time within the calciner of about 5 minutes. Next, the calcined particles were fed into a 1400° C. rotary kiln. The kiln was an 8.9 cm diameter, 1.3 meter long silicon carbide tube inclined at 4.4 degrees with respect to the horizontal and had a 76 cm hot zone. The kiln rotated at 6 rpm to provide a residence time in the kiln of about 5 minutes. The product exited the kiln into room temperature air where it was collected in a metal container and allowed to cool to room temperature.

General Procedure for Making the Abrasive Products

The abrasive grains were utilized in coated abrasive products which were tested for grinding performance. The coated abrasive products were made according to conventional coated abrasive-making procedures. A grade 50 abrasive grain was prepared by taking 50% by weight from abrasive grains that passed through a 40 mesh U.S. standard screen, but remained on a 45 mesh U.S. standard screen. The remaining 50% were abrasive grains that passed through a 40 mesh U.S. standard screen, but were retained on a 50 mesh U.S. standard screen. A grade 40 abrasive grain was prepared by taking 100% by weight of abrasive grains that passed through a 35 mesh U.S. standard screen, but were retained on a 40 mesh U.S. standard screen. Likewise a grade 36 abrasive grain was prepared by taking 50% by weight from abrasive grains that passed through a 25 mesh U.S. standard screen, but remained on a 30 mesh U.S. standard screen. The remaining 50% were abrasive grains that passed through a 30 mesh U.S. standard screen, but were retained on a 35 mesh U.S. standard screen. The abrasive grains were bonded to vulcanized fibre backings using conventional calcium carbonate filled phenolic make resin and conventional calcium carbonate filled phenolic size resins. The make resin was pre-cured by heating to about 88° C. at a rate of about 1.1° C./minute, and then holding at about 88° C. for about 2 hours. The size resin was cured by heating to about 65° C. at a rate of about 1.1° C./minute, and then holding at about 65° C. for about 30 minutes, followed by a heating to about 99° C. at a rate of about 0.6° C./minute, and then holding at about 99° C. for about 12 hours. The abrasive grains were electrostatically coated.

If the coated fiber disc was to be utilized to grind stainless steel, a supersize coating was applied over the size coat. The supersize comprised (by weight) 14.3 parts bisphenol A epoxy resin (EPON 828 obtained from Shell Chemical Co., Houston, Tex.); 9.4 parts polyamide curing agent (Versamid 125 from Henkel Corp., Gulph Mills, Pa.); 71.25 parts $KBF_4$; 1.9 parts thickening agent (Cab-o-sil from Cabot Corp., Kokomo, Ind.); and 3.1 parts iron oxide filler. The supersize coating was deposited from an organic solvent and then heated to cure.

Test Procedure I

The coated abrasive disc was mounted on a beveled aluminum back-up pad and used to grind the face of a 1.25 cm by 18 cm 1018 mild steel workpiece. The disc was driven at 5,500 rpm while the portion of the disc overlaying the beveled edge of the back-up pad contacted the workpiece at about a 7 kg load. Each disc was used to grind a separate workpiece for a one-minute interval for a total time of 12 minutes. The initial cut was the amount of metal removed in the first minute of grinding. Likewise, the final cut was the amount of material removed in the last minute of grinding and the total cut was the summation of the amount removed throughout the test. For most of the examples, the performance of the abrasive grain is stated as percent of the Comparative, that is the total amount of metal removed for the Comparative example was equated to 100% and the abrasive grain of the examples was measured relative to the 100%. There were approximately four discs per Example tested. The error associated with each Test Procedure described herein was about ±5%.

Test Procedure II

The Test Procedure II was essentially the same as Test Procedure I, except that the test endpoint was when the amount of metal removed in a one-minute time interval was less than one-third the value of the initial cut.

Test Procedure III

The Test Procedure III was essentially the same as Test Procedure I, except that the test endpoint was 20 minutes.

Test Procedure IV

The Test Procedure IV was essentially the same as Test Procedure I, except that the workpiece was 304 stainless steel, and the test endpoint was 10 minutes.

Test Procedure V

The Test Procedure V was essentially the same as Test Procedure I, except that the test endpoint was 15 minutes.

Control Example A and Examples 1 and 2

This set of examples compared various abrasive grain compositions. The results can be found in Tables 1 and 2, below.

Comparative Example A

The abrasive grains were made according to the teachings of U.S. Pat. No. 4,881,951. The abrasive grains were made according to the sol-gel method and had a composition of 94.7% alumina, 2.7% lanthanum oxide, 1.3% magnesium oxide, and 1.3% yttrium oxide.

Example 1

The abrasive grains for this Example were made according to General Procedure I and there were multiple impregnation steps for this example. The calcined alumina particles were impregnated three separate times with a zirconyl acetate aqueous solution, and then the resulting particles were impregnated for an additional four times with an aqueous solution that contained magnesium nitrate, yttria nitrate, and lanthanum nitrate. The resulting abrasive grain comprised by weight: about 86.7% alumina, about 8% zirconia, about 1.3% yttria, about 1.3% magnesium oxide, and about 2.7% lanthanum oxide.

Example 2

The abrasive grain for Example 2 was made in the same manner as Example 1, except that the zirconyl acetate was replaced with zirconyl nitrate.

TABLE 1

| | Test Procedure I | |
|---|---|---|
| Example | Initial cut, grams | Total cut, % of Comparative A |
| Comparative A | 83.8 | 100 |
| 1 | 95.4 | 127 |

TABLE 2

| | Test Procedure II | |
|---|---|---|
| Example | Initial cut, grams | Total cut, % of Comparative A |
| Comparative A | 88.3 | 100 |
| 1 | 87.1 | 134 |
| 2 | 87.3 | 107 |

Comparative Example A and Examples 3 through 7

This set of examples compared to various abrasive grain compositions. The test results can be found in tables 4 and 5, below. The test results can be found in Table 4 were for grade 50 fibre discs and the results listed in table 5 were for grade 36. For Examples 3 through 7, the abrasive grains were made according to General Procedure I, and there was a single impregnation step for the examples. The impregnation solution contained lanthanum nitrate, magnesium nitrate, yttrium nitrate, and zirconyl acetate. The amounts of these materials were selected to give the sintered abrasive grain composition described below in Table 3, below.

TABLE 3

| Compositions for Examples 3 through 7 | | | | | |
|---|---|---|---|---|---|
| Example | % $Al_2O_3$ | % $La_2O_3$ | % $Y_2O_3$ | % MgO | % $ZrO_2$ |
| 3 | 94.2 | 2.7 | 1.3 | 1.3 | 0.5 |
| 4 | 93.7 | 2.7 | 1.3 | 1.3 | 1.0 |
| 5 | 92.7 | 2.7 | 1.3 | 1.3 | 2.0 |
| 6 | 91.7 | 2.7 | 1.3 | 1.3 | 3.0 |
| 7 | 90.7 | 2.7 | 1.3 | 1.3 | 4.0 |

TABLE 4

| | Test Procedure III | |
|---|---|---|
| Example | Initial cut, grams | Total cut, % of Comparative A |
| Comparative A | 53.2 | 100 |
| 3 | 53.3 | 120 |
| 4 | 65.6 | 129 |
| 5 | 55.0 | 125 |
| 6 | 58.0 | 123 |
| 7 | 55.6 | 120 |

TABLE 5

| | Test Procedure I | |
|---|---|---|
| Example | Final cut, grams | Total cut, % of Comparative A |
| Comparative A | 83.8 | 100 |
| 3 | 88.6 | 104 |
| 4 | 94.7 | 104 |
| 5 | 93.7 | 110 |
| 6 | 91.8 | 102 |

Control Example A and Examples 8 through 14

This set of examples compared various abrasive grain compositions. The abrasive grains were screened to a grade 36. The test results can be found in Table 7, below. For Examples 8 through 14, the abrasive grains were made according to General Procedure I and there was a single impregnation step for this example. The impregnation solution contained lanthanum nitrate, magnesium nitrate, cerium nitrate, yttrium nitrate, and zirconyl acetate. The amounts of these materials were selected to give the sintered abrasive grain composition described below in Table 6.

TABLE 6

| Compositions for Examples 8 through 14 | | | | | | |
|---|---|---|---|---|---|---|
| Ex. | % $Al_2O_3$ | % $La_2O_3$ | % $Y_2O_3$ | % MgO | % $ZrO_2$ | % $CeO_2$ |
| 8 | 94 | 2.7 | 0 | 1.3 | 1 | 1 |
| 9 | 93 | 2.7 | 0 | 1.3 | 1 | 2 |
| 10 | 92 | 2.7 | 0 | 1.3 | 1 | 3 |
| 11 | 95 | 2.7 | 0 | 1.3 | 1 | 0 |
| 12 | 94 | 2.7 | 1 | 1.3 | 1 | 0 |
| 13 | 93 | 2.7 | 2 | 1.3 | 1 | 0 |
| 14 | 92 | 2.7 | 3 | 1.3 | 1 | 0 |

TABLE 7

Test Procedure I

| Example | Initial cut, grams | Final cut, grams | Total cut, % of Comparative A |
|---|---|---|---|
| Comparative A | 64.6 | 64.5 | 100 |
| 8 | 63.7 | 77.8 | 105 |
| 9 | 68.1 | 79.7 | 110 |
| 10 | 64.0 | 80.1 | 111 |
| 11 | 68.6 | 77.9 | 109 |
| 12 | 64.8 | 86.1 | 112 |
| 13 | 71.2 | 84.7 | 115 |
| 14 | 71.5 | 84.3 | 113 |

Examples 15 through 26

This set of examples compared various abrasive grain compositions. The abrasive grains were screened to a grade 50. The test results can be found in Tables 8 through 11, below. For Examples 15 through 28, the abrasive grains were made according to General Procedure II, and there was a single impregnation step for this example. The impregnation solution contained lanthanum nitrate, magnesium nitrate, and yttrium nitrate. The amounts of these materials were selected to give the sintered abrasive grain composition described below in Table 8. For Examples 15, 17, 19, 21, 23, and 25, the zirconia sol was stabilized with acetic acid and had a pH of 3.5. For Examples 16, 18, 20, 22, 24, and 26 the zirconia sol was stabilized with nitric acid and had a pH of 0.5.

TABLE 8

Compositions for Examples 15 through 28

| Example | % $Al_2O_3$ | % $La_2O_3$ | % $Y_2O_3$ | % MgO | % $ZrO_2$ |
|---|---|---|---|---|---|
| 15 | 82.9 | 2.7 | 1.3 | 1.3 | 11.8 |
| 16 | 82.9 | 2.7 | 1.3 | 1.3 | 11.8 |
| 17 | 93.9 | 2.7 | 1.3 | 1.3 | 0.8 |
| 18 | 93.9 | 2.7 | 1.3 | 1.3 | 0.8 |
| 19 | 93.1 | 2.7 | 1.3 | 1.3 | 1.6 |
| 20 | 93.1 | 2.7 | 1.3 | 1.3 | 1.6 |
| 21 | 91.5 | 2.7 | 1.3 | 1.3 | 3.2 |
| 22 | 91.5 | 2.7 | 1.3 | 1.3 | 3.2 |
| 23 | 88.5 | 2.7 | 1.3 | 1.3 | 6.2 |
| 24 | 88.5 | 2.7 | 1.3 | 1.3 | 6.2 |
| 25 | 78.0 | 2.7 | 1.3 | 1.3 | 16.7 |
| 26 | 78.0 | 2.7 | 1.3 | 1.3 | 16.7 |

TABLE 9

Test Procedure I

| Example | Initial cut, grams | Final cut, grams | Total cut, % of Comparative A |
|---|---|---|---|
| Comparative A | 81.3 | 68.6 | 100 |
| 15 | 93.8 | 61.6 | 106 |
| 16 | 93.1 | 83.0 | 116 |

TABLE 10

Test Procedure III

| Example | Initial cut, grams | Final cut, grams | Total cut, % of Comparative A |
|---|---|---|---|
| Comparative A | 59.1 | 32.1 | 100 |
| 17 | 63.0 | 39.1 | 109 |
| 18 | 58.5 | 43.3 | 105 |
| 19 | 61.4 | 35.2 | 111 |
| 20 | 59.6 | 31.4 | 96 |

TABLE 11

Test Procedure III

| Example | Initial cut, grams | Final cut, grams | Total cut, % of Comparative A |
|---|---|---|---|
| Comparative A | 62.5 | 30.6 | 100 |
| 21 | 66.7 | 62.1 | 129 |
| 22 | 65.1 | 62.7 | 127 |
| 23 | 64.9 | 56.9 | 129 |
| 24 | 66.7 | 58.3 | 126 |

TABLE 12

Test Procedure III

| Example | Initial cut, grams | Final cut, grams | Total cut, grams |
|---|---|---|---|
| 15 | 66.6 | 50.8 | 1390 |
| 16 | 66.8 | 47.4 | 1423 |
| 17 | 68.1 | 36.5 | 1367 |
| 18 | 65.3 | 37.2 | 1311 |

Examples 27 through 30

This set of examples compared various abrasive grain compositions. The abrasive grains were screened to a grade 36. The test results can be found in Table 14, below. For these examples, the abrasive grains were made according to General Procedure I and there was a single impregnation step for this example. The impregnation solution contained the lanthanum nitrate, magnesium nitrate, yttrium nitrate, and zirconyl acetate. The amounts of these materials were selected to give the sintered abrasive grain composition described below in Table 13, below.

TABLE 13

Compositions for Examples 27 through 30

| Example | % $Al_2O_3$ | % $La_2O_3$ | % $Y_2O_3$ | % MgO | % $ZrO_2$ |
|---|---|---|---|---|---|
| 27 | 92.0 | 3 | 1 | 3.5 | 0.5 |
| 28 | 91.5 | 3 | 1 | 3.5 | 1 |
| 29 | 90.5 | 3 | 1 | 3.5 | 2 |
| 30 | 89.5 | 3 | 1 | 3.5 | 3 |

TABLE 14

Test Procedure I

| Example | Initial cut, grams | Final cut, grams | Total cut, grams |
|---|---|---|---|
| 27 | 73.9 | 83.1 | 974 |
| 28 | 71.9 | 87.6 | 999 |
| 29 | 81.3 | 76.9 | 981 |
| 30 | 75.6 | 81.2 | 1001 |

Examples 31 through 36

This set of examples compared various abrasive grain compositions. The abrasive grains were screened to a grade 40. The test results can be found in Table 15, below. For these examples, the abrasive grains were made according to General Procedure II and the impregnation solution contained the nitrate salt of a rare earth and magnesium nitrate. For Example 31, the rare earth was dysprosium. Example 32 was gadolinium; Example 33 was lanthanum; Example 34 was neodymium; Example 35 was praseodymium; and Example 36 was samarium. The sintered abrasive grain for this set of examples contained 92.7% alumina, 2% zirconia, 2.7% rare earth oxide, 1.3 yttria, and 1.3% magnesium oxide.

TABLE 15

Test Procedures I and IV

| Example | Procedure I Total cut, grams (1018 Steel) | Procedure IV Total cut, grams (304 Stainless Steel) |
|---|---|---|
| 31 | 967 | 152 |
| 32 | 935 | 160 |
| 33 | 948 | 177 |
| 34 | 1130 | 190 |
| 35 | 1097 | 101 |
| 36 | 972 | 171 |

Examples 37 through 40

This set of examples compared various abrasive grain compositions. The abrasive grains were screened to a grade 50. The test results can be found in Table 17, below. For these examples, the abrasive grains were made according to General Procedure II and there was a single impregnation step for this example. The impregnation solution contained lanthanum nitrate, yttrium nitrate, and magnesium nitrate. The amounts of these materials were selected to give the sintered abrasive grain composition described below in Table 16.

TABLE 16

Compositions for Examples 37 through 40

| Example | % Al$_2$O$_3$ | % La$_2$O$_3$ | % Y$_2$O$_3$ | % MgO | % ZrO$_2$ |
|---|---|---|---|---|---|
| 37 | 94 | 2.7 | 1.3 | 0 | 2 |
| 38 | 93.6 | 2.7 | 1.3 | 0.4 | 2 |
| 39 | 93.25 | 2.7 | 1.3 | 0.75 | 2 |
| 40 | 92.7 | 2.7 | 1.3 | 1.3 | 2 |

TABLE 17

Test Procedures IV and V

| Example | Total cut, grams (1018 Steel) | Total cut, grams (304 Stainless Steel) |
|---|---|---|
| 37 | 1250 | 165 |
| 38 | 1212 | 200 |
| 39 | 1306 | 238 |
| 40 | 1251 | 200 |

Comparative Example B and Example 41

This set of examples compared various abrasive grain compositions. The abrasive grains were screened to a grade 40. The test results can be found in Table 18. Control Example B was made according to Example 38 of U.S. Pat. No. 4,314,827, the disclosure of which is incorporated herein by reference. Example 41 was made according to General Procedure for Making the Abrasive Grains III. The sintered abrasive grain composition for Example 41 was 84% alumina, 5% magnesium oxide, 6% cerium oxide, and 5% zirconia.

TABLE 18

Test Procedure I

| Example | Initial cut, grams | Final cut, grams | Total cut, % of Comparative B |
|---|---|---|---|
| Comparative B | 97 | 60 | 1112 |
| 41 | 95 | 88 | 1230 |

Control Example C and Examples 42 through 45

This set of examples compared various abrasive grain compositions. The abrasive grains were screened to a grade 50. The test results can be found in Table 19, below. Comparative Example C was made according to the teachings of U.S. Pat. No. 4,881,951 (impregnation procedure) and contained 96% alumina, 1% lanthanum oxide, 1% neodymium oxide, 1% magnesium oxide, and 1% yttria. Examples 42 through 45 were made according to General Procedure for Making Abrasive Grains IV. The sintered abrasive grain composition for Examples 42 and 43 were 96% alumina, 2.5% zirconia, 1% lanthanum oxide, 1% neodymium oxide, 1% magnesia, and 1% yttria. The sintered abrasive grain composition for Examples 44 and 45 were 96% alumina, 2.5% zirconia, 1% lanthanum oxide, 1% neodymium oxide, 1% magnesium oxide, and 1% yttria. Note that for Examples 42 and 44 zirconia sol contained acetic acid to stabilize the sol, while each of Examples 43 and 45 utilized nitric acid to stabilize the sol.

TABLE 19

Test Procedure III

| Example | Initial cut, grams | Final cut, grams | Total cut, grams |
|---|---|---|---|
| Comparative C | 74 | 16 | 1271 |
| 42 | 87 | 38 | 1694 |
| 43 | 84 | 36 | 1553 |
| 44 | 77 | 44 | 1541 |
| 45 | 84 | 6 | 1380 |

Comparative Examples D and E and Example 46

This set of examples compared various abrasive grain compositions. The abrasive grains were screened to a grade 50. The test results can be found in Table 20, below. Comparative Example D was made according to the teachings of U.S. Pat. No. 4,314,827 and contained 93% alumina and 7% magnesium oxide. Comparative Example E was made according to the teachings of U.S. Pat. No. 4,314,827 and contained 90% alumina, 5% zirconia and 5% magnesium oxide. Example 46 was made according to the General Procedure III for Making the Abrasive Grains. The abrasive grain contained 5% zirconia, 1.3% magnesium oxide, 1.3% yttria, 2.7% lanthanum oxide, and 89.7% alumina.

TABLE 20

| Example | Total cut, grams |
| --- | --- |
| Comparative D | 927 |
| Comparative E | 982 |
| 46 | 1016 |

It was also observed by X-Ray Diffraction that the zirconia present in Example 46 was 100% in the tetragonal form. For Control E, the zirconia present was 70% in the tetragonal and 30% in the monoclinic. The tetragonal is the preferred form and it is believed that it is responsible for the increase in performance.

The abrasive grain examples described above exhibited the hardness and toughness values listed in Table 21, below. The procedures used for measurement were as referenced above in the text.

Specifically, for both the microhardness and the toughness measurements, abrasive grains were mounted in a conventional molding compound (commercially available under the trade designation "EPOMET" from Buehler, Ltd. of Evanston, Ill.) in 2.5 cm (1 inch) diameter stainless steel mold rams. The grains and the molding compound were then pressed at 27.6 MPa (4000 psi) and simultaneously heated to about 150° C. in a conventional mounting press (commercially available under the trade designation "BUEHLER PNEUMET I MOUNTING PRESS" from Buehler, Ltd.). The molding compound was then cured by holding it at about 150° C. for about 5 minutes. The cured molding compound was then cooled to room temperature.

The mounted abrasive grains were then polished using a polishing unit (commercially available under the trade designation "DIALOG" from Buehler, Ltd.) having a microprocessor control that dispenses abrasive slurries to the polishing area (commercially available under the trade designation "METLAP I" from Buehler, Ltd.). The polishing was done in the following successive stages:

| Stage 1 | |
| --- | --- |
| Polishing surface: | alumina platen, 20.3 cm diameter (commercially available under the trade designation "METLAP 10" from Buehler, Ltd.) |
| Abrasive Type & Size: | 30 micrometer diamond slurry (commercially available under the trade designation "METADI DIAMOND SLURRY" from Buehler, Ltd.) |
| Polishing Time: | 3 minutes, or until the surface is flat |
| Force: | 22.2N/sample (5 pounds/sample) |
| Speed setting: | 240 rpm |
| Dispensing sequence: | 1 second spray on; 10 spray off |
| Relative rotation: | clockwise |
| Stage 2 | |
| Polishing surface: | polishing cloth (commercially available under the trade designation "TEXMET POLISHING CLOTH" from Buehler, Ltd.) clamped on a 20.3 diameter aluminum platen (commercially available under the trade designation "METLAP" from Buehler, Ltd.). |
| Abrasive Type & Size: | 6 micrometer diamond slurry (commercially available under the trade designation "METADI DIAMOND SLURRY" from Buehler, Ltd.) |
| Polishing Time: | 10 minutes |
| Force: | 22.2N/sample (5 pounds/sample) |
| Speed setting: | 120 rpm |
| Dispensing sequence: | 1 second spray on; 10 spray off |
| Relative rotation: | counterclockwise |
| Stage 3 | |
| Polishing surface: | polishing cloth ("TEXMET POLISHING CLOTH") clamped on a 20.3 diameter aluminum platen ("METLAP") |
| Abrasive Type & Size: | 1 micrometer diamond slurry (commercially available under the trade designation "METADI DIAMOND SLURRY" from Buehler, Ltd.) |
| Polishing Time: | 30 minutes |
| Force: | 22.2N/sample (5 pounds/sample) |
| Speed setting: | 120 rpm |
| Dispensing sequence: | 1 second spray on; 10 seconds spray off |
| Relative rotation: | clockwise |

The Vickers microhardness of the abrasive grains were measured using a conventional microhardness tester with a diamond indenter (commercially available under the trade designation "MINILOAD 2 MICROHARDNESS TESTER" from Leitz of Germany). The indenter (a highly polished pointed square pyramidal diamond with a face angle of 136 degrees) was brought into contact gradually and smoothly with the sample to be measured. The predetermined load was 500 grams. The average of 20 measurements for each example are provide in Table 21, below.

The toughness measurement was made using the same instrument as described above for the Vickers microhardness measurement, wherein a predetermined load was applied to the sample to be tested causing cracks to generate at the apex of the diamond shape impression of the indenter. The toughness would be determined using the following equation:

$$\text{Toughness}, K_1 = \frac{F_N}{((\text{pi})c)^{3/2} (\tan \beta)},$$

wherein c is the crack radius, $F_N$ is the indentor load, and $\beta$ is the semi-apical angle of the indenter (68 degrees for a Vickers diamond). The average of 20 measurements for each example are provided in Table 21, below. Further, Table 21 provides the density of the abrasive grain, as measured with a Micromeritics AccuPyc (Norcross, Ga.) 1330 pycnometer.

TABLE 21

Density, Hardness and Toughness of Selected Examples

| Example | Density, g/cm³ | Hardness, GPa | Toughness, MPa.m^{1/2} |
| --- | --- | --- | --- |
| Comparative A | 3.85 | 19 | 3.6 |
| Comparative D | 3.57 | 16 | |
| Comparative E | 3.87 | 18 | |

TABLE 21-continued

Density, Hardness and Toughness of Selected Examples

| Example | Density, g/cm³ | Hardness, GPa | Toughness, MPa·m^(1/2) |
|---|---|---|---|
| 1 | 4.04 | 22.3 | 4.4 |
| 3 | 3.92 | 22.1 | 4.1 |
| 4 | 3.91 | 22.1 | 4.1 |
| 5 | 3.90 | 22.3 | 4.3 |
| 6 | 3.91 | 22.3 | 4.3 |
| 7 | 3.91 | 22.3 | 4.4 |
| 8 | 3.93 | | |
| 9 | 3.93 | | |
| 10 | 3.94 | | |
| 11 | 3.91 | 21.4 | |
| 12 | 3.96 | 21.7 | |
| 13 | 3.99 | 22.2 | |
| 14 | 3.99 | 22.1 | |
| 15 | 4.09 | 22.6 | 4.1 |
| 16 | 4.08 | 22.6 | 4.0 |
| 17 | 3.98 | 22.2 | 4.1 |
| 18 | 3.98 | 22.2 | 4.0 |
| 19 | 3.98 | 22.3 | 4.1 |
| 20 | 3.99 | 22.2 | 4.1 |
| 21 | 4.01 | 22.7 | 4.1 |
| 22 | 3.98 | 22.6 | 4.1 |
| 23 | 4.03 | 22.8 | 4.1 |
| 24 | 4.04 | 22.4 | 4.0 |
| 25 | 4.11 | 22.5 | 4.2 |
| 26 | 4.10 | 22.3 | 4.1 |
| 29 | 3.94 | | |
| 30 | 3.93 | | |
| 31 | 3.93 | | |
| 32 | 3.89 | | |
| 46 | 4.03 | 22 | |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A ceramic abrasive grain comprising at least about 70 percent by weight alumina, at least about 0.1 percent by weight zirconia, and at least about 0.1 percent by weight metal oxide selected from the group consisting of: (a) yttria; (b) a rare earth oxide selected from the group of consisting of oxides of: ytterbium, neodymium, lanthanum, praseodymium, samarium, gadolinium, cerium, dysprosium, erbium, and mixtures thereof; and (c) mixtures thereof, based on the total weight of said abrasive grain, wherein said alumina is present as one of alpha alumina, at least one alumina reaction product, or a combination thereof, said zirconia is present as one of zirconia, at least one zirconia reaction product, or a combination thereof, and said metal oxide is present as one of a metal oxide, at least one metal oxide reaction product, or a combination thereof, and wherein said abrasive grain has an average hardness of at least about 21 GPa and an average toughness of at least about 4 MPa·m^(1/2).

2. An abrasive grain according to claim 1 wherein said metal oxide is said rare earth oxide.

3. An abrasive grain according to claim 1 further comprising magnesium oxide, wherein said magnesium oxide is present as at least one magnesium oxide reaction product.

4. A ceramic abrasive grain comprising by weight:
   (a) about 70 to about 95% alumina, said alumina being present as one of alpha alumina, at least one alumina reaction product, or a combination thereof;
   (b) about 0.1 to about 15% zirconia, said zirconia present as one of zirconia, at least one zirconia reaction product, or a combination thereof; and
   (c) about 0.1 to about 10% rare earth oxide selected from the group consisting of oxides of: neodymium, praseodymium, samarium, ytterbium, lanthanum, gadolinium, cerium, dysprosium, erbium, and mixtures thereof, said rare earth oxide being present as on of a rare earth oxide at least one rare earth oxide reaction product or a combination thereof, said ceramic abrasive grain having an average hardness of at least about 21 GPa and an average toughness of at least about 4 MPa·m^(1/2).

5. An abrasive grain according to claim 4 further comprising by weight at least one of yttria in the range from about 0.1 to about 10% or magnesium oxide in the range from about 0.3 to about 10%, said yttria being present as at least one yttria reaction product, and said magnesium oxide being present as at least one magnesium oxide reaction product.

6. An abrasive grain according to claim 4 wherein said alumina present as one of alpha alumina, at least one alumina reaction product, or a combination thereof is present in the range from about 85 to about 93% by weight; said zirconia present as one of zirconia, at least one zirconia reaction product, or a combination thereof is present in the range from about 0.5 to about 8% by weight; and said rare earth oxide is present in the range from about 0.5 to about 5% by weight.

7. An abrasive grain according to claim 6 further comprising by weight at least one of yttria in the range from about 0.1 to about 3% or magnesium oxide in the range from about 0.3 to about 1.5%, said yttria being present as at least one yttria reaction product, and said magnesium oxide being present as at least one magnesium oxide reaction product.

8. An abrasive grain according to claim 4 further comprising at least one of a metal oxide coating, a silica coating, or a combination thereof thereon.

9. An abrasive grain according to claim 4 wherein said abrasive grain comprises equiaxed zirconia particles distributed between alpha alumina crystallites, said zirconia particles having an average particle size of less than about 0.1 micrometer.

10. An abrasive grain according to claim 9 wherein said at least one rare earth reaction product comprises about 5 to about 30% by weight of material according to the formula:

MLnAl$_{11}$O$_{19}$ wherein:
   O is oxygen;
   M is a divalent metal cation;
   Ln is a rare earth metal ion; and
   Al is aluminum ion.

11. An abrasive grain according to claim 4 wherein said rare earth reaction product comprises about 5 to about 30% by weight of material according to the formula:

MLnAl$_{11}$O$_{19}$ wherein:
   O is oxygen;
   M is a divalent metal cation;
   Ln is a rare earth metal ion; and
   Al is aluminum ion.

12. An abrasive article including:
   (a) a binder; and
   (b) a plurality of abrasive grain according to claim 4 secured within said article by said binder.

13. An abrasive article according to claim 12 wherein said abrasive article is a grinding wheel.

14. An abrasive article according to claim 12 wherein said abrasive article is a cutoff wheel.

15. An abrasive article according to claim 12 wherein said abrasive article is a nonwoven abrasive product.

16. A coated abrasive article comprising:
   (a) a backing having a major surface; and
   (b) an abrasive layer comprising abrasive grain according to claim 4 secured to said major surface of said backing by a binder.

17. An alpha alumina-based ceramic abrasive grain comprising at least about 70% by weight alumina, at least about 0.1% by weight zirconia, and at least about 0.1% by weight rare earth oxide, based on total weight of said abrasive grain, and having:
   (a) an alpha alumina matrix comprising alpha alumina crystallites;
   (b) a plurality of equiaxed zirconia particles distributed between said alpha alumina crystallites; and
   (c) a plurality of platelets distributed between said alpha alumina crystallites and said zirconia particles, wherein said platelets exhibit a magnetoplumbite crystal structure, and wherein said platelets comprise material represented by the formula:

$MLnAl_{11}O_{19}$ wherein:
   O is oxygen;
   M is a divalent metal cation;
   Ln is a rare earth metal ion; and
   Al is aluminum ion,
   said alpha alumina-based ceramic abrasive grain having an average hardness of at least about 21 GPa and an average toughness of at least about 4 MPa·m$^{1/2}$.

18. An abrasive grain according to claim 17 wherein said alpha alumina crystallites are less than about 1 micrometer in diameter.

19. An abrasive grain according to claim 17 including by weight:
   (a) about 70 to about 95% by weight alumina, said alumina being present as one of said alpha alumina crystallites or said alpha alumina crystallites and alumina reaction product;
   (b) about 0.1 to about 15% by weight zirconia, said zirconia present as one of said zirconia particles or said zirconia particles and zirconia reaction product; and
   (c) about 5 to about 30% by weight of said platelets.

20. A ceramic abrasive grain comprising a sintered product of precursor material comprising:
   (i) at least about 70% by weight alumina;
   (ii) at least about 0.1% by weight zirconia; and
   (iii) at least about 0.1% by weight metal oxide selected from the group consisting of: yttria; a rare earth oxide selected from the group consisting of: ytterbium, neodymium, lanthanum, praseodymium, samarium, gadolinium, cerium, dysprosium, erbium and mixtures thereof; and mixtures of yttria and said rare earth oxide; based on the total weight of said precursor material, said sintered product having an average hardness of at least about 21 GPa and an average toughness of at least about 4 MPa·m$^{1/2}$.

21. A method of preparing an abrasive grain having an average hardness of at least about 21 GPa and an average toughness of at least about 4 MPa·m$^{1/2}$, said method comprising the steps of:
   (a) providing a dispersion comprising:
      (i) alpha aluminium oxide monohydrate; and
      (ii) a zirconium component selected from the group consisting of zirconia particles; zirconium salt material; and mixtures thereof;
   (b) forming porous solid base grit material from said dispersion;
   (c) impregnating said porous solid base grit material with an impregnating solution of oxide precursor selected from the group consisting of precursor to oxides of: ytterbium, neodymium, lanthanum, praseodymium, samarium, gadolinium, cerium, dysprosium, erbium, yttrium, and mixtures thereof; and
   (d) converting said impregnated porous solid base grit material to abrasive grain, said step of converting including a step of sintering the base grit material to provide said abrasive grain.

22. A method according to claim 21 wherein said dispersion is an aqueous dispersion, said impregnating solution is an aqueous solution, said oxide precursor is a salt, and said dispersion is dried and calcined before said impregnation.

* * * * *

UNITED STATES PATENT AND TRADEMARK OFFICE
CERTIFICATE OF CORRECTION

PATENT NO. : 5,498,269
DATED : March 12, 1996
INVENTOR(S) : Larmie

It is certified that error appears in the above-indentified patent and that said Letters Patent is hereby corrected as shown below:

Title page:
In the "References Cited" list, Patent No. 4,997,461, please change "Markhoff-Mathay et al." to --Markhoff-Matheny et al.--

In column 2, line 46, please change "$\neq$" to --+3--

In column 9, line 51, please change "$\neq$" to --+3--

In column 10, line 43, please change "vice versa" to --vice versa--

In column 15, line 61, please change "The test results can be found in Table 4" to --The results listed in Table 4--

In column 16, Table 5, please change "83.8" to --80.9--

In column 18, Table 12, please change "17" to --25--

In column 18, Table 12, please change "18" to --26--

In column 22, Table 21, please change "MPa.m½" to -- $MPa \cdot m^{1/2}$ --

In column 23, Table 21, please change "MPa.m½" to -- $MPa \cdot m^{1/2}$ --

UNITED STATES PATENT AND TRADEMARK OFFICE
CERTIFICATE OF CORRECTION

PATENT NO.  : 5,498,269
DATED       : March 12, 1996
INVENTOR(S) : Larmie

It is certified that error appears in the above-indentified patent and that said Letters Patent is hereby corrected as shown below:

In column 23, line 66, please change "oneof" to --one of--

In column 24, line 5, please change "on" to --one--

In column 26, line 5, please change "of precursor" to --of a precursor--

Signed and Sealed this

Twenty-sixth Day of August, 1997

Attest:

BRUCE LEHMAN

*Attesting Officer*  *Commissioner of Patents and Trademarks*